United States Patent [19]

Weber et al.

[11] Patent Number: 5,468,143
[45] Date of Patent: Nov. 21, 1995

[54] GAS-FUELED INFRARED HEATER

[75] Inventors: Horst Weber, Lüdenscheid; Alfred Normann, Alsbach, both of Germany

[73] Assignee: Colsman & Co. GmbH, Werdohl-Kleinhammer, Germany

[21] Appl. No.: 246,666

[22] Filed: May 20, 1994

[30] Foreign Application Priority Data

May 20, 1993 [DE] Germany ............... 43 16 946.5

[51] Int. Cl.⁶ ................................................. F23D 14/16
[52] U.S. Cl. .......................... 431/243; 431/242; 431/328; 431/329; 431/354; 431/11; 431/207; 126/92 AC; 126/92 B
[58] Field of Search .............. 126/92 AC, 92 B, 126/85 A; 431/326, 328, 329, 207, 242, 243, 247, 354, 11

[56] References Cited

U.S. PATENT DOCUMENTS

| | | | |
|---|---|---|---|
| 3,139,881 | 7/1964 | Fannon, Jr. et al. | 431/329 X |
| 3,203,413 | 8/1965 | Hartzell et al. | 431/329 X |
| 3,307,529 | 3/1967 | Fannon, Jr. et al. | 126/92 B |
| 5,139,415 | 8/1992 | Schwank | 431/329 X |

FOREIGN PATENT DOCUMENTS 1564766  4/1969  France ............... 126/92 AC

OTHER PUBLICATIONS

WO 9014557, Nov. 1990, Javet, U.S.

*Primary Examiner*—Carl D. Price
*Attorney, Agent, or Firm*—Herbert Dubno

[57] ABSTRACT

An infrared heater, especially for construction purposes or for animal brooders in which the air duct passes through the reflector on the side of a glow body turned away from the surface to be irradiated so that the air duct is heated by the glow body. Within the heated region of the air duct, a filter is provided which is heated to red heat, thereby pyralizing or burning off deposits and maintaining the filter free from obstruction for long periods.

16 Claims, 3 Drawing Sheets

GAS-FUELED INFRARED HEATER

FIELD OF THE INVENTION

Our present invention relates to a gas-fueled infrared radiator for heating purposes, especially for use in construction applications and in brooders. More particularly, the invention relates to an infrared radiating heater having a gas burner with an air supply duct and a glow element, such as a tube or other refractory body heatable by combustion for emitting infrared radiation and, preferably, also a reflector from which radiant energy is directed at a surface to be irradiated.

BACKGROUND OF THE INVENTION

Gas-fueled infrared heaters for the purposes described are generally operated with natural gas or liquified gases and utilize temperature-resistant radiating elements in the form of wire fabric or mesh, perforated plates, perforated thermal bodies or the like. Surface temperatures with such irradiators are generally above 500° C. and usually about 900° C.

With such radiating heaters, a portion of the radiant energy is directly emitted from the radiating element onto the surface to be irradiated. Another portion of the radiant energy is reflected onto the surface as secondary radiation from the heater housing which can be formed as a reflector. The remainder of the radiant energy is lost from the outer surfaces of the housing. The efficiency of such an infrared heater can be about 50% and as a consequence can be too low for use in modern heating systems.

In infrared heaters of the aforedescribed type, the air supplied to the burner can be passed through a filter element which is located upstream of a mixing chamber in which combustion is effected or the fuel gas is admixed with the air supplied through the duct to sustain combustion.

In the applications described for such infrared heaters, for example, in construction and as animal-brooder heaters, such filters are essential since the ambient air often contains high proportions of dust.

Furthermore, in animal brooder installations, the ambient air which is drawn in to the heater may also have high moisture content. Both the dust and moisture content of the inducted air can lead to rapid reduction of the flow cross section of any filter element provided upstream of the burner nozzles and chamber to prevent contamination of the personnel.

Because of the reduction in the free cross section of the filter element, the ratio between the air and gas feeds to the burner can change from the stoichiometric.

The result can be an emission of carbon monoxide. The emission of carbon monoxide is, of course, dangerous because in many applications of such burners, the region in which the burner is used has limited fresh air access and the carbon monoxide can be detrimental to the health of personnel and animals in the region, even leading to death.

Since cleaning or replacement of filter elements, for example, during the brooder period of animals, is difficult to carry out because in part the heating should not be interrupted and the animals disturbed, earlier systems utilizing filters have not proved to be fully satisfactory. Furthermore, systems which require frequent replacement or cleaning of filter elements are also associated with high maintenance costs.

OBJECTS OF THE INVENTION

It is the principal object of the present invention, therefore, to provide an improved infrared heater for the purposes described which requires less maintenance and is free from some of the detrimental characteristics of earlier systems, especially those described above.

Another object of this invention is to provide an improved infrared heater which requires less cleaning or replacement and maintenance of the air-filter element and which operates at higher efficiency than earlier infrared heaters.

Still another object of the invention is to provide an improved gas-fueled infrared heater which is safer to use and more effective than earlier heaters, especially of the type described.

SUMMARY OF THE INVENTION

These objects and others are obtained with an infrared heater in which the air duct or air-supply passage extends along a region heated by the burner and wherein the filter element is provided in this heated region so that the filter element, of a heat-resistant material, can be heated to a temperature causing destruction of particulates and other materials which tend to collect on this filter body.

More particularly, the gas-fueled infrared radiator for heating purposes, especially for an animal brooder or for use in construction can comprise:

a reflector;

a glow element in the reflector heated by combustion gases and radiating heat toward a surface to be heated and toward the reflector, the reflector radiating heat toward the surface;

a means on the reflector receiving a fuel gas and air and generating combustion gases for heating the glow element so as to form a gas burner with the glow element;

an air duct extending through the reflector in heat-exchanging relationship with the glow body for preheating of air from the glow body and connected to the burner for delivering preheated air thereto; and a heat-resistant air filter in the duct in a region thereof heated by the glow element for filtering particulates from the air, filtered particulates on the filter being destroyed by heat from the glow element conducted to the filter.

With this construction of the infrared heater, we can achieve a preheating of the combustion air and a pyrolytic cleaning of the filter body. The waste heat from the burner which might otherwise be lost, effects a heating of the air-supply passage and thus a heating of the air traversing same. The filter element in the heated region of the air duct can be brought to red heat so that dust particles in the turbulent air flow in the region of the filter element coming in contact with the red-hot surfaces can be burned or pyrolytically decomposed. The heating of the inducted air can reduce the relative humidity therein and eliminate problems with condensation on filtering surfaces. As a consequence, maintenance-free operation, even in the presence of high-efficiency filter elements and in environments containing high concentrations of dust particles and moisture in the combustion air can be carried out for much longer periods of time than has hitherto been possible. For example, such heaters can operate for a minimum of 50 days without maintenance.

As a result, the filter element can be so formed that it does not require replacement and thus replacement maintenance costs can be eliminated altogether.

With the system of the invention, moreover, the carbon monoxide content of effluent gases even after long periods of operation can be held well below a limit of 0.1%. The efficiency of the apparatus is thus also improved. Condensation in the region of the mixing chamber and in the mixing tube which can result from the cold generated by expansion of combustion gases such as propane, butane and natural gas emerging gas outlet nozzles, can be suppressed as well.

According to a feature of the invention, the air duct extends along the side of the burner turned away from the surface to be irradiated and is in contact with this side of the burner. A portion of the air duct can form the bottom part of the glow tube or glow element turned away from the surface to be irradiated.

According to another feature of the invention, the filter element can be composed of a heat-resistant (refractory) metal, especially steel, or from another inorganic material. The filter element can be formed by or can include wire fabric or mesh, perforated plates, porous filter plates, honeycomb bodies or like elements traversed by the combustion gases.

According to a feature of the invention, the air duct and gas nozzle open into an injector tube, communicating with a mixing chamber of the burner and at least one secondary air passage can connect the air duct with the mixing tube.

This construction optimizes the mixture in the mixing tube and utilizes the flow energy in the mixing tube to draw the combustion air into the mixing tube by the injector principle. The result is an intensive mixing of the gas/air mixture with additional oxygen supply as is necessary to ensure complete and efficient combustion.

The glow element can have its base side formed by a wall of the air duct which can close the channel or trough-shaped glow element tube having a semicircular or triangular cross section or a hollow body of hemispherical, pyramid, frustopyramid, conical or frustoconical shape. The result is a high primary radiation in the direction of the surface to be irradiated with a back radiation for a lesser area away form the surface to be irradiated and to the air duct and the filter element. The burner housing can be internally or externally lined with thermal insulation along surfaces turned away from the surface to be irradiated.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
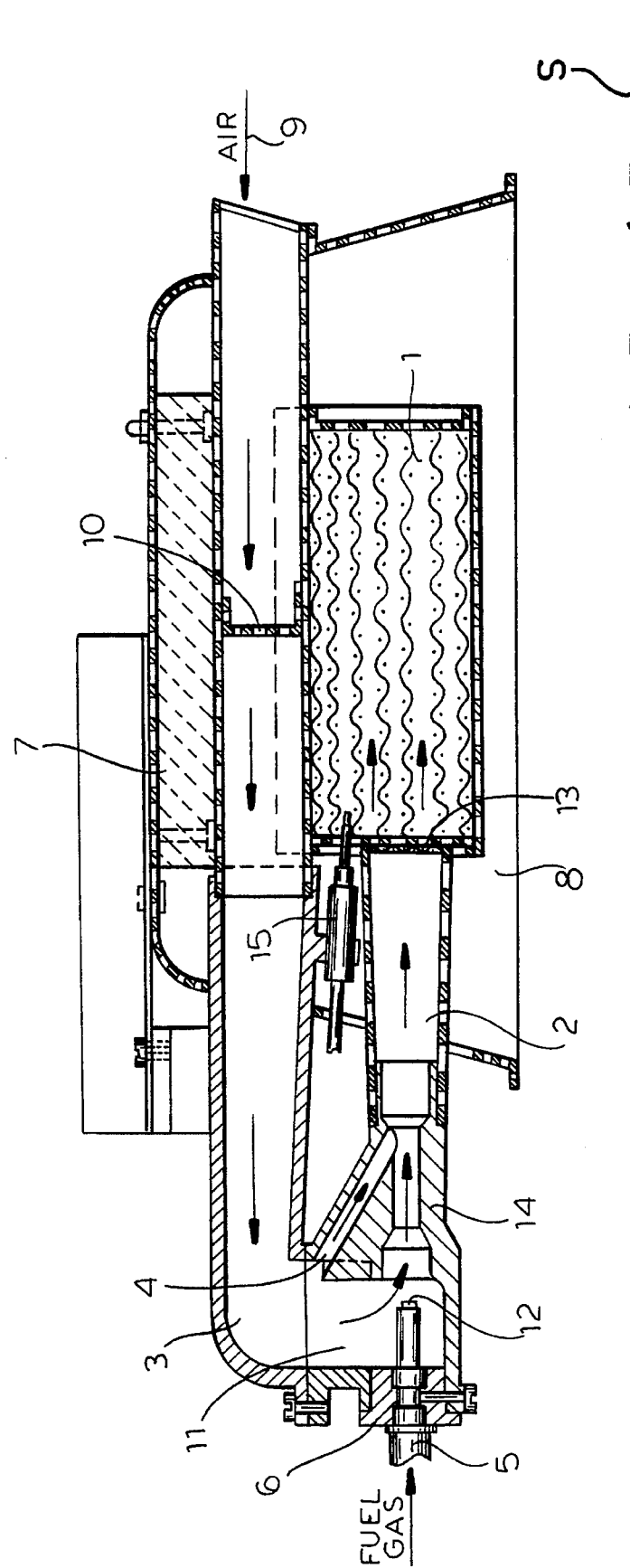
FIG. 1 is a longitudinal section through an infrared heater in accordance with the present invention.

The infrared burner shown in FIG. 1 is gas fueled and serves for space heating in construction or for animal brooders. The gas burner comprises a burner housing 8 which simultaneously forms a reflector directed toward a surface S to be heated. Extending through this housing 8 is an air duct 3 which, in the drawing, has been shown at the upper part of the housing turned away from the side of the housing facing the surface S. The air duct 3 has an elbow 11 in the region of the gas feed. The gas feed is effected through a gas outlet nozzle 12 of a gas line 5 which can be provided with ignition safety represented at 15 (i.e. a flame detector), cutting off the gas flow (through the line 5 by means not shown) when the flame is extinguished.

The gas and the air from duct 3 enter via an injector or venturi tube 14, a mixing chamber in the form of a tube 2. The mixing tube 2 terminates in a glowing grid 13 traversed by the composite gases and opening into a glow element 1 in the form of a heat-resistant metal shell provided internally with a gas permeable body. The venturi tube 19, the flowing grid 13, the mixing tube 2 and the glow element 1 form the burner of the apparatus. The metal shell may have a grid structure if desired and is located at the lower portion of the housing 8. The combustion gases, consisting primarily of nitrogen, carbon dioxide and water vapor can be discharged through the grid forming the glow element 1. The air intake for the duct 3 is represented at 9 in FIG. 1 and within this duct a filter element 10 is provided as an air filter.

A secondary air passage 4 is branched from the air duct 3 and opens directly into the mixing tube 2 so that secondary air can be drawn into the mixing tube in the region of the connection between the mixing chamber and the injector tube 14 by the suction generated by the Venturi effect. Above the air duct 3 and the glow element 1 of the burner, thermal insulation 7 of a refractory material is provided.

In operation of the burner, the waste heat at the upper side of the glow element 1 is utilized to heat the air duct 3 so that the air traversing same is preheated. In addition, the filter 10, because it is in heat-conductive relationship with the wall of the duct and the upper side of the glow element 1, is brought to red heat.

Because of the heated filter, dust particles or the like adhering to the air filter, are burned off or pyrolyzed and particles entrained in the air burn up as they contact the glowing filter.

As a result, the free flow cross section of the filter element is maintained without obstruction by deposits on the filter element. The filter element can be composed of heat-resistant steel in a form of a wire mesh fabric, perforated plate or the like. It can be composed of another inorganic material like alumina in the form of a filter plate, honeycomb body or the like.

FIGS. 2–9 and 2a–9a show various configurations of the glow element 1. While in some cases, the glow element is illustrated to be hollow, in all cases it will generally be formed as a gas-permeable element, i.e. a mesh or perforated metal and can be free from filling or provided with a heat-resistant filling of wire mesh, perforated or porous bodies or honeycomb structure. Only the overall configuration has been illustrated in FIGS. 2–9 and 2a–9a.

Figure 2:
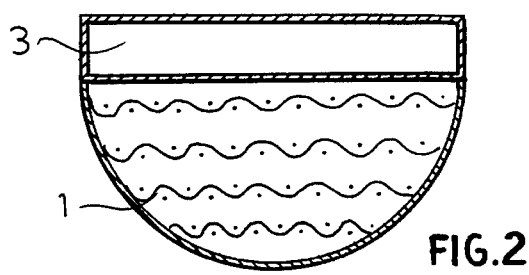
FIGS. 2, 3, 4, 5, 6, 7, 8 and 9 are sectional views showing air ducts associated with various configurations of hollow glow bodies.
Figure 2A:
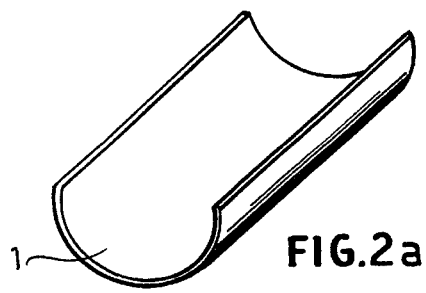
FIGS. 2a, 3a, 4a, 5a, 6a, 7a, 8a and 9a are respective perspective views of these bodies.

From FIGS. 2 and 2a, it will be apparent that the duct 3 can be a flat member closing upwardly upon a trough-shaped structure which can, if desired, be closed at its ends, the trough-shaped structure forming a glow element 1. The duct forms the upper wall of the base of the trough which is of semicircular cross section. This configuration by comparison to a completely round body of circular cross section has a substantially higher primary radiation in the direction of the surface to be heated, the heat transfer in the direction opposite this surface being reduced because of the smaller surface area of the base.

Figure 3:
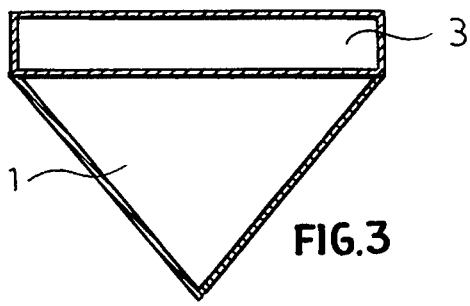
Figure 3A:
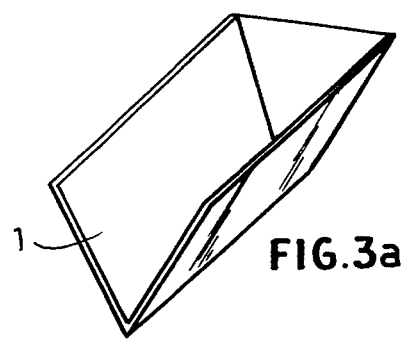

FIGS. 3 and 3a show a similar trough-shape in the trough cross section as triangular. The sides of the trough are of equal length, the triangle being an isosceles triangle. The sides of the trough as well as its ends may be provided as grid structures.

Figure 4:
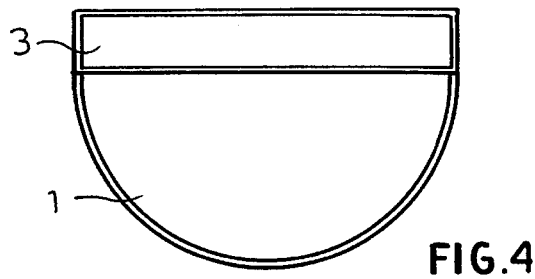
Figure 4A:
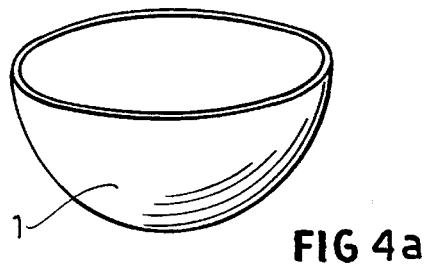

The embodiment of FIGS. 4 and 4a utilizes a glow element with a hemispherical configuration, the heat uniformly radiating from all sides of the hemisphere.

Figure 5:
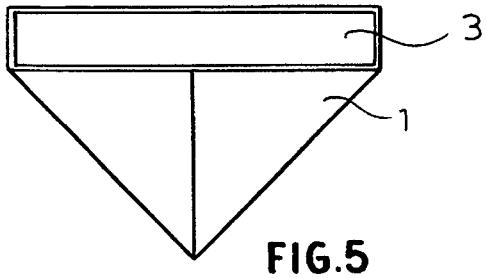
Figure 5A:
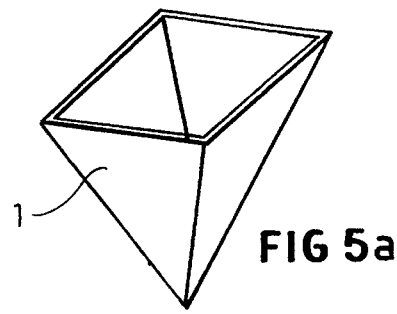
Figure 6:
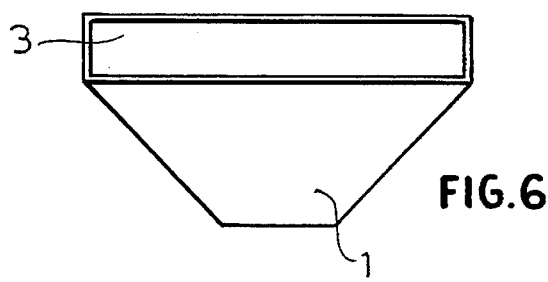
Figure 6A:
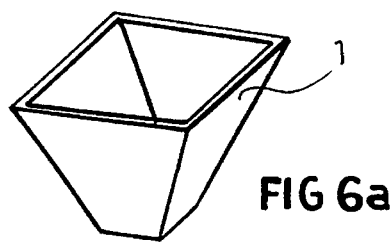

In the embodiment of FIGS. 5 and 5a, the glow element has the configuration of a four-sided pyramid while in FIG. 6 and 6a the glow element has the configuration of a four-sided frustopyramid.

Figure 7:
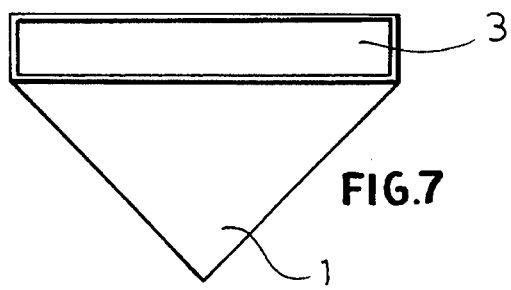
Figure 7A:
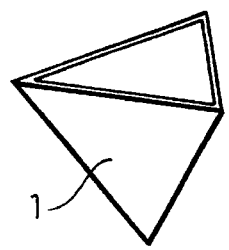
Figure 8:
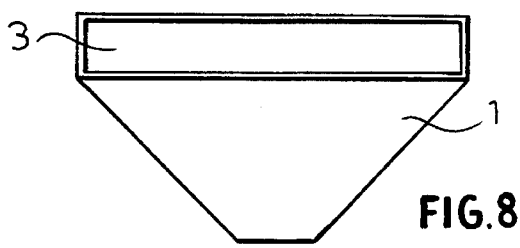
Figure 9:
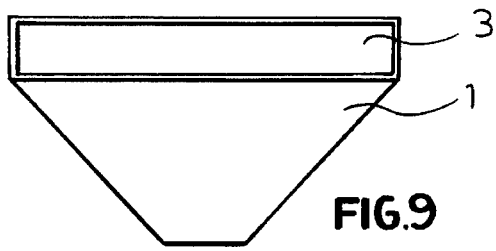
Figure 8A:
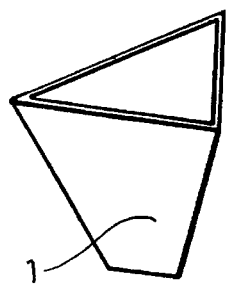
Figure 9A:
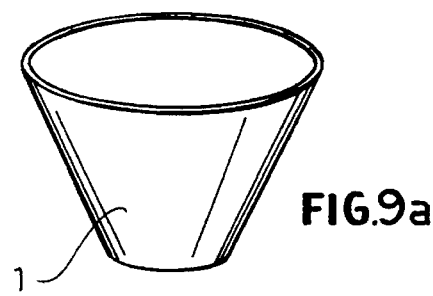

FIGS. 7 and 7a show a glow element with the configuration of a three-sided pyramid while FIGS. 8 and 8a illustrate a glow element in the configuration of a three-sided frustopyramid. The embodiment of FIGS. 9 and 9a has a glow element with the configuration of a frustocone.

We claim:

1. A gas-fueled infrared radiator for heating purposes, in said radiator comprising:

a reflector;

a glow element in said reflector heated by combustion gases and radiating heat toward a surface to be heated and toward said reflector, said reflector radiating heat toward said surface;

means on said reflector receiving a fuel gas and air and generating combustion gases for heating said glow element;

an air duct extending through said reflector in heat-exchanging relationship with said glow body for preheating of air from said glow body and connected to said burner for delivering preheated air thereto; and a heat-resistant air filter in said duct in a region thereof heated by said glow element for filtering particulates from the air, filtered particulates on said filter being destroyed by heat from said glow element conducted to said filter.

2. The gas-fueled infrared radiator defined in claim 1 wherein said air supply duct extends along a side of said burner facing away from said surface and is in contact with said side.

3. The gas-fueled infrared radiator defined in claim 2 wherein said air supply duct closes a side of said glow element facing away from said surface.

4. The gas-fueled infrared radiator defined in claim 3 wherein said filter is composed of a heat resistant metal.

5. The gas-fueled infrared radiator defined in claim 4 wherein said metal is steel.

6. The gas-fueled infrared radiator defined in claim 3 wherein said filter is composed of a heat resistant inorganic material.

7. The gas-fueled infrared radiator defined in claim 3 wherein the filter is an element traversed by air in the form of a screen, perforated plate, porous filter body or honeycomb.

8. The gas-fueled infrared radiator defined in claim 7 wherein said duct and a fuel gas nozzle open into an injector tube of said burner, said means on said reflector having a mixing tube downstream of said injector tube, and a secondary air passage connecting said duct with said mixing tube.

9. The gas-fueled infrared radiator defined in claim 8 wherein said glow element is a hollow body opening toward said duct at a base of said body and having a semicircular or triangular cross section or the configuration of a hemisphere, pyramid, frustopyramid, cone or frustocone.

10. The gas-fueled infrared radiator defined in claim 1 wherein said air supply duct closes a side of said glow element facing away from said surface.

11. The gas-fueled infrared radiator defined in claim 1 wherein said filter is composed of a heat resistant metal.

12. The gas-fueled infrared radiator defined in claim 11 wherein said metal is steel.

13. The gas-fueled infrared radiator defined in claim 11 wherein said filter is composed of a heat resistant inorganic material.

14. The gas-fueled infrared radiator defined in claim 1 wherein the filter is an element traversed by air in the form of a screen, perforated plate, porous filter body or honeycomb.

15. The gas-fueled infrared radiator defined in claim 1 wherein said duct and a fuel gas nozzle open into an injector tube of said burner, said means on said reflector having a mixing tube downstream of said injector tube, and a secondary air passage connecting said duct with said mixing tube.

16. The gas-fueled infrared radiator defined in claim 1 wherein said glow element is a hollow body opening toward said duct at a base of said body and having a semicircular or triangular cross section or the configuration of a hemisphere, pyramid, frustopyramid, cone or frustocone.

* * * * *